(12) United States Patent
McEntee et al.

(10) Patent No.: US 8,096,750 B2
(45) Date of Patent: Jan. 17, 2012

(54) HIGH EFFICIENCY TURBINE AND METHOD OF GENERATING POWER

(75) Inventors: Jarlath McEntee, Castine, ME (US); Christopher Sauer, Portland, ME (US); Patrick McGinnis, Jenkintown, PA (US); Millard Firebaugh, Annapolis, MD (US)

(73) Assignee: Ocean Renewable Power Company, LLC, Portland, ME (US)

( * ) Notice: Subject to any disclaimer, the term of this patent is extended or adjusted under 35 U.S.C. 154(b) by 453 days.

(21) Appl. No.: 12/414,279

(22) Filed: Mar. 30, 2009

(65) Prior Publication Data

US 2010/0140947 A1  Jun. 10, 2010

(51) Int. Cl.
*F03D 7/06* (2006.01)
(52) U.S. Cl. ........................................ 415/4.2; 415/907
(58) Field of Classification Search ............ 415/3.1–4.5, 415/71.72, 75, 53.1–53.3, 905–907; 416/176–178, 416/187, 277 R, 277 A
See application file for complete search history.

(56) References Cited

U.S. PATENT DOCUMENTS

| | | | |
|---|---|---|---|
| 958,599 A | 5/1910 | Cooksey | |
| 1,835,018 A | 12/1931 | Darrieus | |
| 1,987,065 A | 1/1935 | Karl | |
| 2,106,928 A | 2/1938 | Lee | |
| 3,986,787 A | 10/1976 | Moulton, Jr. et al. | |
| 4,012,163 A | 3/1977 | Baumgartner | |
| 4,084,918 A | 4/1978 | Pavlecka | |
| 4,134,707 A | 1/1979 | Ewers | |
| 4,237,384 A | 12/1980 | Kennon | |
| 4,412,417 A | 11/1983 | Dementhon | |
| 4,534,699 A * | 8/1985 | Possell ............................ 415/42 |
| 4,555,218 A | 11/1985 | Jonsson et al. | |
| 5,156,525 A * | 10/1992 | Ciokajlo .................... 415/199.5 |
| 5,405,246 A | 4/1995 | Goldberg | |
| 5,451,137 A | 9/1995 | Gorlov | |
| 5,451,138 A | 9/1995 | Istorik et al. | |
| 5,499,904 A | 3/1996 | Wallace et al. | |
| 5,577,882 A | 11/1996 | Istorik et al. | |
| 5,642,984 A | 7/1997 | Gorlov | |
| 5,720,597 A | 2/1998 | Wang et al. | |
| 6,036,433 A | 3/2000 | Skinner | |
| 6,036,443 A | 3/2000 | Gorlov | |
| 6,155,892 A | 12/2000 | Gorlov | |

(Continued)

FOREIGN PATENT DOCUMENTS

DE          2948060          6/1981

(Continued)

*Primary Examiner* — Gary F. Paumen
(74) *Attorney, Agent, or Firm* — Pierce Atwood, LLC; Kevin M. Farrell, Esq.; Katherine A. Wrobel, Esq.

(57) ABSTRACT

The present invention is directed to a turbine comprising a pair of opposing end discs concentrically aligned with a central axis of the turbine and a plurality of blades extending between the end discs. At least one end discs is adapted for engaging with a generator for generating power. The plurality of blades rotates in a single direction when exposed to fluid flow and thereby rotates the pair of opposing end discs. The plurality of blades are interconnected by at least one faired ring oriented parallel to the pair of opposing end discs and intersecting the plurality of blades, wherein the at least one faired ring is in concentric alignment with the central axis. The present invention further comprises a method for generating power comprising engaging the turbine with a generator to create a turbine generator unit and deploying the turbine generator unit within a fluid flow.

20 Claims, 10 Drawing Sheets

U.S. PATENT DOCUMENTS

| | | |
|---|---|---|
| 6,253,700 B1 | 7/2001 | Gorlov |
| 6,293,835 B2 | 9/2001 | Gorlov |
| 7,156,609 B2 | 1/2007 | Palley |
| 7,257,946 B2 | 8/2007 | Welch, Jr. |
| 7,362,004 B2 | 4/2008 | Becker |
| 2005/0247282 A1* | 11/2005 | Yuksel ............ 123/204 |
| 2007/0126292 A1* | 6/2007 | Lugg .............. 310/11 |
| 2009/0022597 A1 | 1/2009 | Bowie |
| 2010/0251692 A1* | 10/2010 | Kinde, Sr. ........... 60/226.1 |
| 2011/0014046 A1* | 1/2011 | Gallet .............. 416/1 |

FOREIGN PATENT DOCUMENTS

| | | |
|---|---|---|
| EP | 1 335 130 B1 | 2/2003 |
| JP | 63-57874 | 3/1963 |
| SU | 1242637 | 7/1986 |
| WO | 0148374 A2 | 7/2001 |

\* cited by examiner

DETAIL A
SCALE 0.100

HIGH EFFICIENCY TURBINE AND METHOD OF GENERATING POWER

BACKGROUND

1. Field of the Invention

The present invention relates generally to turbines and more specifically to a highly efficient unidirectional turbine that harnesses energy from a fluid flow to produce power.

2. Discussion of Background Information

For many years turbines have been harnessing energy from fluid flow to produce power. Windmills, gyromills, delta turbines and cyclomills have long harnessed energy from wind and converted the same to power. Hydropower turbines harness ocean and tidal currents which are capable of providing a virtually inexhaustible supply of emission-free renewable energy. For example, the Darrieus turbine, a wind turbine, and the Gorlov Helical Turbine (GHT), a water turbine, each take a unique approach to harnessing energy in fluid flow to generate power.

The Darrieus wind turbine, a Vertical Axis Wind Turbine (VAWT), comprises vertical airfoils affixed in a symmetric arrangement to a vertical shaft. The vertical shaft connects to a gear box and generator for converting torque to power. Although effective for harnessing wind power from air flowing from any direction, this VAWT presents several disadvantages. First, the Darrieus turbine fails to self start and requires some initial force to begin rotating in a current. Second, the airfoils produce maximum torque at two points in their rotation cycle, the two points at which the airfoils are perpendicular to direction of airflow. The Darrieus turbine airfoils thus present a varying angle of attack in relation to current, and this leads to a sinusoidal fluctuation in resultant torque that creates a potentially destructive resonance at a natural frequency of the hydrofoil blades. The Darrieus turbine therefore requires some sort of braking mechanism for slowing rotation of the VAWT prior to destructive resonance. Lastly, the shaft of the Darrieus turbine couples with a generator requiring gearing multiplication and that gearing presents yet another potential mode of mechanical failure.

The GHT is a water based turbine based in principal on the Darrieus turbine in that airfoil shaped blades run along a center shaft and axis of rotation. The design of GHT, however, addresses some of the deficiencies of the Darrieus turbine. First, the hydrofoil blades of the GHT twist about the axis of rotation in a helical pattern such that the blades present a constant, optimal angle of attack within a current. This eliminates the resonance issue associated with the Darrieus turbine. Second, the GHT requires minimal gearing multiplication between the turbine and power generator. Despite these improvements, the GHT, however, presents some constraints. GHT efficiency is measured up to only about 35%. Also, because the helical configuration of blades sweeps a circumference of right cylinder, large centrifugal stresses develop. The GHT generally requires containment and constraint within a structure having an inflow and outflow channel preferably including inwardly extending, contoured sidewalls for guiding fluid flow and reducing turbulence.

U.S. patent application Ser. No. 11/985,971, incorporated herein by reference, addresses some of these issues. In that application, two or more spiral wound blades form a barrel shaped turbine that efficiently harnesses fluid flow for the generation of energy. That turbine comprises radial spokes that anchor each of the two or more spiral wound blades to a central shaft of the turbine. The radial spokes and central shaft potentially create drag and potentially accumulate debris, such as seaweed, which also may reduce efficiency. Furthermore, in certain embodiments, the configuration of spokes may address deflection issues insufficiently because the two or more blades are independently anchored to the central shaft, thereby preventing any load transfer between the active and non-active blades.

Because ocean and tidal currents exist everywhere in the world and either flow constantly or at an extremely predictable rate of change, converting the energy in these currents to electricity could provide a predictable, reliable supply of electricity to electric power systems in many parts of the world. Approximately seventy percent (70%) of the population of the entire world lives within two hundred miles of an ocean, making that an accessible source of renewable energy. Accordingly, a need exists in the art for an easily produced, sturdy, highly efficient turbine that produces high power output at low speeds and efficiently harnesses energy from a wide range of sites and water flow conditions including, tidal currents, open ocean currents, rivers, causeways, canals, dams and any other natural or manmade water flow.

SUMMARY OF THE INVENTION

The present invention solves the problems associated with existing hydropower turbines and provides a highly efficient, easily produced, sturdy turbine that produces high power output at low speeds and efficiently harnesses energy from a wide range of sites and water flow conditions.

The present invention includes a turbine comprising a pair of opposing end discs bounding the turbine at both ends, wherein the pair of opposing end discs is in concentric alignment with a central axis and wherein at least one opposing end disc is adapted for engaging with a generator. The turbine comprises a plurality of blades that rotate in a single direction when exposed to fluid flow, wherein the plurality of blades extend between the pair of opposing end discs and are disposed evenly about the central axis, and wherein the rotating plurality of blades causes the pair of opposing end discs to rotate. The plurality of blades have an airfoil-shaped cross section, where the airfoil cross section presents a non-zero angle of attack to the current, which angle is defined by an intersection of the chord of the airfoil-shaped cross section and a tangential line abutting the same cross section and oriented in the direction of relative fluid flow.

The plurality of blades wind in a spiral trajectory around the central axis. The spiral wound trajectory has a variable radius along the length of the central axis such that a distance measured from the plurality of blades to the center axis is greater near the center of the length of the turbine than at either end. The rotating plurality of blades accordingly sweeps a circumference of a barrel-shaped cylinder. Lastly, the turbine comprises at least one faired ring oriented parallel to the pair of opposing end discs and intersecting the plurality of blades, wherein the at least one faired ring is in concentric alignment with the central axis. In some embodiments, each of the plurality of blades traverses one or more 360 degree turns about the central axis and in other embodiments, the cumulative sweep of the plurality of blades traverses one or more 360 degree turns about the central axis.

The present invention also comprises a method of generating power comprising providing a pair of opposing end discs, wherein the pair of opposing end discs is in concentric alignment with a central axis and wherein at least one opposing end disc is adapted for engaging with a generator. The method comprises providing a plurality of blades that rotate in a single direction when exposed to fluid flow, wherein the plurality of blades extend between the pair of opposing end discs and are disposed evenly about the central axis, and wherein the rotating plurality of blades causes the pair of opposing end discs to rotate. The plurality of blades further comprise an airfoil-shaped cross section having a non-zero angle of attack, which angle is defined by an intersection of the chord of the airfoil-shaped cross section and a tangential line abutting the same cross section and oriented in the direction of relative fluid flow. Additionally, the plurality of blades have a spiral wound trajectory around the central axis and have a variable radius along the length of the central axis such that a distance measured from the plurality of blades to the central axis is greater at the center of the turbine than at either end.

After providing the plurality of blades, the method comprises providing at least one faired ring oriented parallel to the pair of opposing end discs and intersecting the plurality of blades, wherein the at least one faired ring is in concentric alignment with the central axis. The next steps comprise providing a generator for engaging with at least one of the pair of opposing end discs, attaching the generator and the plurality of blades to the pair of opposing end discs to create a turbine generator unit assembly, and deploying the turbine generator unit within a fluid flow.

BRIEF DESCRIPTION OF THE DRAWINGS

These and other features and advantages of embodiments of the present invention are described in greater detail below with reference to the following figures.

DETAILED DESCRIPTION

The present invention includes a turbine and method of generating power. The unique design of the present invention provides for a highly efficient, easily produced, scalable turbine that produces high power output at low fluid velocity and efficiently harnesses energy from a wide range of sites and water flow conditions. The method of making the turbine is a low cost, easily reproduced and scalable process. Various features and advantages of the present invention are described below with reference to several preferred embodiments and variations thereof. Those skilled in the art, however, will understand that alternative embodiments of the structures and methods illustrated herein may be employed without departing from the scope and principles of the described invention.

As shown in FIGS. 1A through 4C, exemplary embodiments of the highly efficient turbine 100 of the present invention each comprise a pair of opposing end discs 102a, 102b that bound the turbine 100 at both ends and a plurality of blades 105 extending between the pair of opposing end discs 102a, 102b. The opposing end discs 102a, 102b are in concentric alignment with a central axis 110 of the turbine 100, and at least one opposing end disc 102a, 102b is adapted for engaging with a generator, such as that disclosed in U.S. patent application Ser. No. 11/975,581 to Sauer et al., incorporated herein by reference. Additionally, the turbine 100 comprises at least one faired ring 107 oriented parallel to the pair of opposing end discs 102a, 102b and intersecting the plurality of blades 105. The at least one faired ring 107 is also in concentric alignment with the central axis 110 of the turbine.

The plurality of blades 105 rotate in a single direction when exposed to fluid flow and cause the pair of opposing end discs 102a, 102b to rotate. The plurality of blades 105 is disposed evenly about the central axis and traces a spiral wound path about a central axis 110 of the turbine 100. The spiral wound trajectory of the plurality of blades 105 has a variable radius along the length of the turbine 100 such that a distance measured from the plurality of blades 105 to the central axis 110 is greater at the center of the turbine 100 than at either end. For example, as depicted clearly in the embodiments of FIGS. 1A, 2A, 3A, 4A and 7A, the plurality of blades 105 assume a shape equivalent to a curve traced on a barrel by rotation of a point crossing the circular right cross-sections of the barrel at a changing oblique angle. The plurality of blades 105 thus presents a spiral wound trajectory having a variable radius along the length of the central axis 110.

In the embodiments of FIGS. 1A through 4C and 7A through 7D, the turbine 100 assumes a barrel shape when the plurality of blades 105 are retained at fixed positions relative to the central axis by at least one faired ring 107. A distance D measured from the central axis 110 of the turbine 100 to the point of intersection between the at least one faired ring 107 and the plurality of blades 105 varies along the length of central axis 110. For example, as depicted clearly in FIG. 3A, a first faired ring 107a is disposed at or near the middle point of the central axis 110 so that the intersections between the first faired ring and the plurality of blades 105 exists at a first distance D3a from the central axis. That first distance D3 is longer than a second distance D3b measured between the central axis 110 and a pair of second faired rings 107b disposed astride the first faired ring 107a and between the first faired ring 107a and the end discs 102a, 102b. This gradual decrease in the diameter of the faired rings 107a, 107b, ensures that the plurality of blades 105 have a variable radius lying along the walls of circular barrel shape of the turbine 100. The unique trajectory of the plurality of blades 105 (spiral wound and barrel bowed) increases blade strength and reduces stresses and stains under load conditions. This unique barrel shape also helps ensure that the turbine 100 of the present invention operates at a higher efficiency than a right cylinder turbine.

In addition to a barrel shape, other characteristics add to the efficiency of the turbine 100 of the present invention. For example, in one embodiment, the plurality of blades 105, in addition to spiraling around the central axis 110 at a varying radius, may traverse one or more cumulative 360 degree turns about the central axis 110. In the embodiment of FIGS. 1A, 2A, 3A, 4A and 7A, each blade 105 traverses a 90 degree turn and the plurality of blades 105 comprises 4 blades 105. In this embodiment, at least one section of the plurality of blades 105 is in a favorable flow position all the time, and the plurality of blades 105 cumulatively sweep a 360 degree radius. In yet another embodiment, the turbine 100 comprises 3 blades 105, each turning 120 degrees. In other embodiments, the turbine 100 may comprise 5 blades 105, each turning 72 degrees or 6 blades 105, each turning 60 degrees. Selecting a particular number of blades 105 depends on the particular river or tide site characteristics. In all embodiments, however, the cumulative sweep of the plurality of blades 105 totals 360 degrees.

Figure 5:
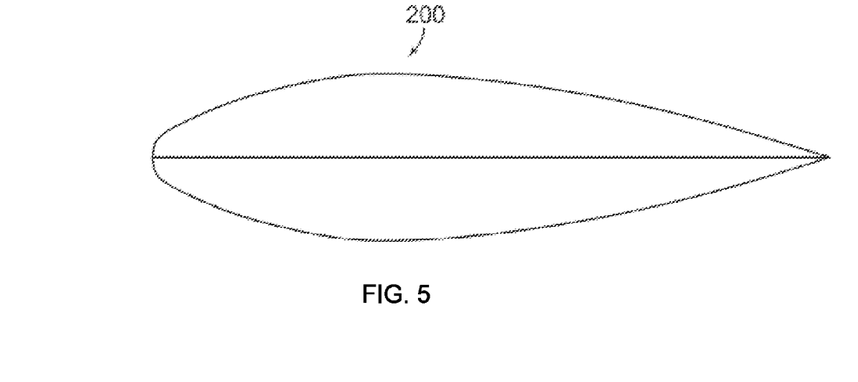
FIG. 5 depicts a cross section of one embodiment of a turbine blade of the present invention.
Figure 6:
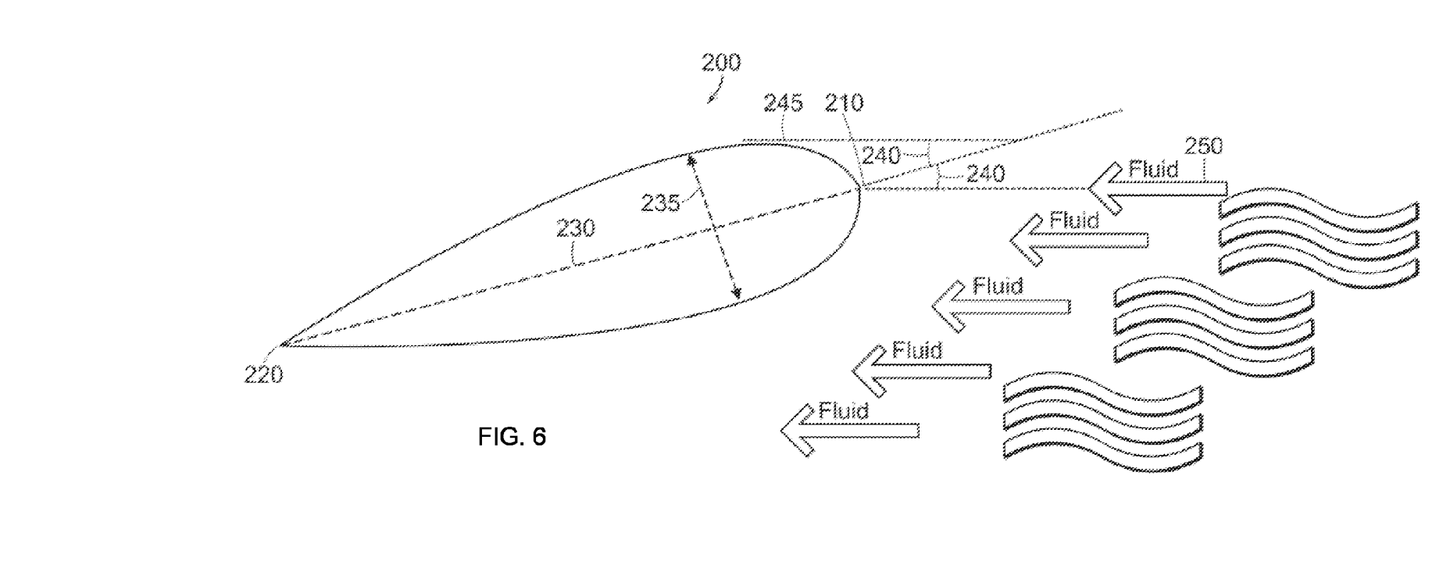
FIG. 6 depicts the cross section of FIG. 5 disposed in a fluid flow.
Figures 7A, 7B:
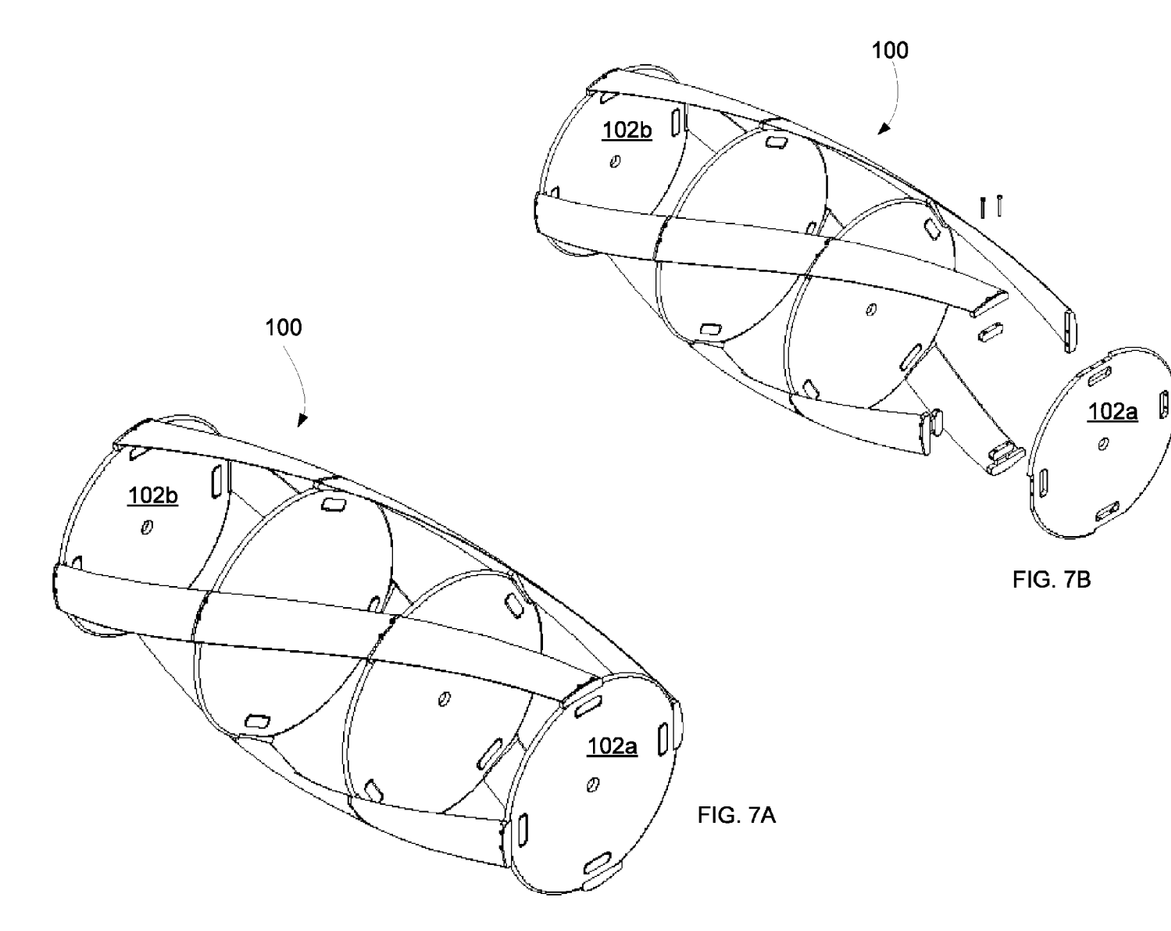
FIG. 7A depicts a perspective view of one embodiment of the turbine of the present invention.
FIG. 7B depicts a perspective exploded view of the embodiment of the turbine of FIG. 7A.
Figure 7C:
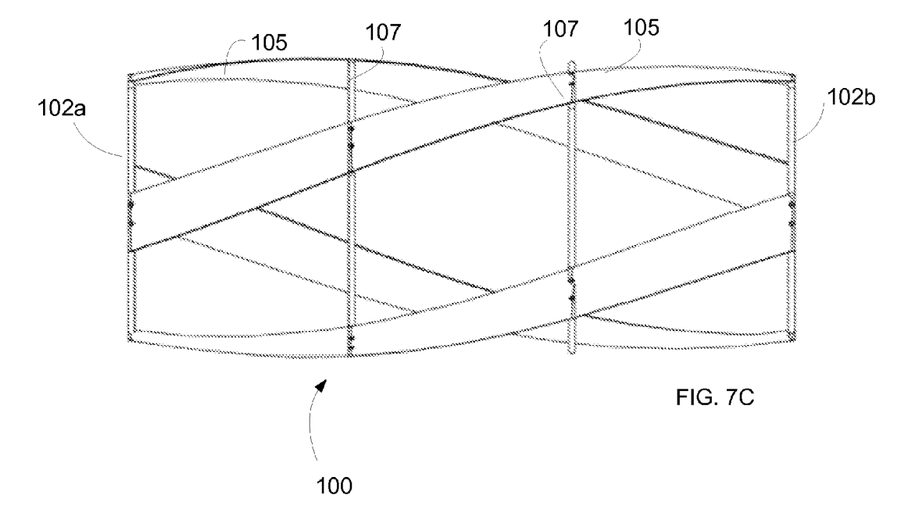
FIG. 7C depicts a side view of the embodiment of the turbine of FIG. 7A.
Figure 7D:
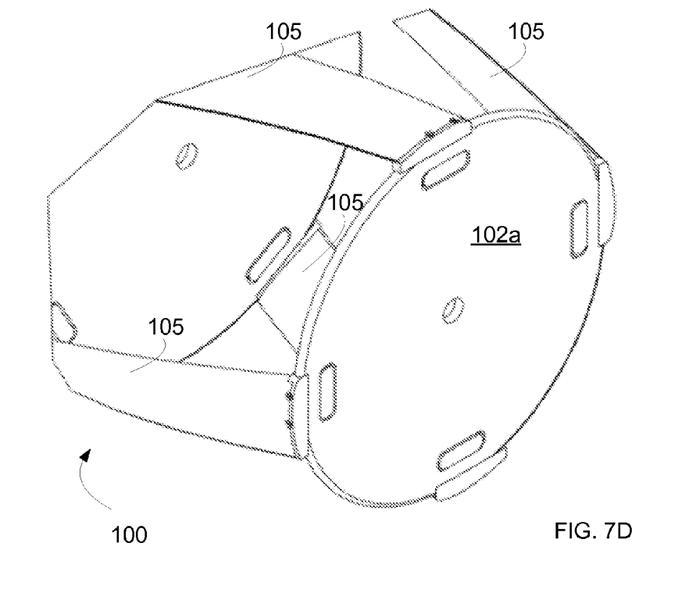
FIG. 7D depicts an enlarged perspective partial view of the embodiment of the turbine of FIG. 7A.

Turning now to FIGS. 5 and 6, the plurality of blades 105 have an airfoil, or hydrofoil, shaped cross-section 200 having a leading edge 210, a trailing edge 220 and a centerline chord 230. In one embodiment of the present invention, the hydrofoil cross-section 200 comprises an aerodynamic aspect ratio, for example, NACA 0018 or NACA 0020. This configuration maximizes the speed of rotation of the turbine 100 and enables the plurality of blades 105 to have a solid configuration that withstands centrifugal and fluid flow forces. The hydrofoil cross-section 200 may be symmetrical about the centerline chord 230, but preferably is asymmetrical. An asymmetrical design helps generate maximum torque and thereby contributes to achieving maximum efficiency.

The hydrofoil cross-section 200 also presents a non-zero angle of attack 240 for generating lift and maximizing generated torque. The angle of attack 240 is an angle defined by an intersection of the centerline chord 230 and a tangential line 245 abutting the hydrofoil cross-section 200 and oriented in the direction of relative fluid flow 250. In one embodiment of the present invention, the angle of attack 240 varies along the length of each of the plurality of blades 105. The plurality of blades 105 always presents at least one point, and more preferably at least two points, having an optimal non-zero angle of attack 240 relative to the direction of fluid flow 250. This variable angle of attack 240 compensates for the slower peripheral speed at a central radius along the length of the turbine 100. This configuration of one or more blades 105 each winding about a central axis 110 at a varying angle of attack 240 thus reduces potential for turbulence during turbine rotation and adds to the efficiency of the turbine 100.

The varying, non-zero angle of attack 240 also ensures that the pressure differential around the hydrofoil cross section 200 of the turbine 100 self starts the turbine 100 upon deployment in a fluid flow 250. Additionally, the turbine 100 of the present invention, like other turbines operating under a lift force principle rather than a drag force principle, rotates in one direction only regardless of the direction of fluid flow 250. The aerodynamic blades of the turbine 100 of the present invention thus are capable of efficiently harnessing energy from a fluid flow 250 approaching the turbine 100 from any direction.

In addition to the hydrofoil-cross section 200 of the plurality of blades 105 helping to maximize generated torque, the at least one faired ring 107 also contributes to that end result. The streamlined, rounded leading edge 210 of the at least one faired ring 107 is oriented in the same direction as the leading edge 210 of the plurality of blades 105, and that further contributes to the efficiency of the hydrodynamic design of the turbine 100. In some embodiments, the at least one faired ring 107 may be ring shaped, as demonstrated in the embodiments of FIGS. 1A through 4C, and in other embodiments, the at least one faired ring 107 may be disc shaped, as depicted in FIGS. 7A through 7D. Depending on turbine size and speed of fluid flow 250, a solid surface disc embodiment of the at least one faired ring 107 may be preferred for assisting with load transfer between active and non-active blades 105 and/or for assisting with maintaining laminar fluid flow 250 through the submerged turbine 100. In any embodiment, the at least on faired ring 107 creates less drag than a plurality of independent radial support spokes similarly located along the length of a central shaft 112 for supporting the plurality of blades 105.

The at least one faired ring 107 functions to transfer load from an active blade 105 to one or more inactive blades 105. This reduces stress and strain on the active blades and decreases deflection of the plurality of blades 105. Because of this reduction in stress and strain, the plurality of blades 105 made be manufactured and/or molded from a sturdy, lightweight material such as a fiberglass composite. The at least one faired ring 107 of the turbine 100 also may be molded from a fiber reinforced composite. This creates a sturdy, lightweight structure capable of resisting deformation under high load conditions.

Figure 9A:
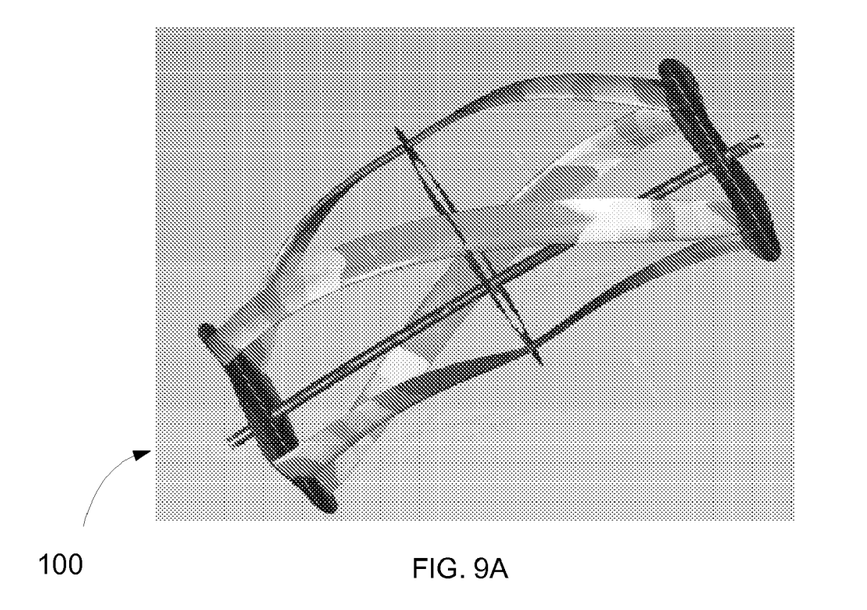
FIG. 9A depicts an analytical model of one embodiment of the turbine of the present invention.
Figure 9B:
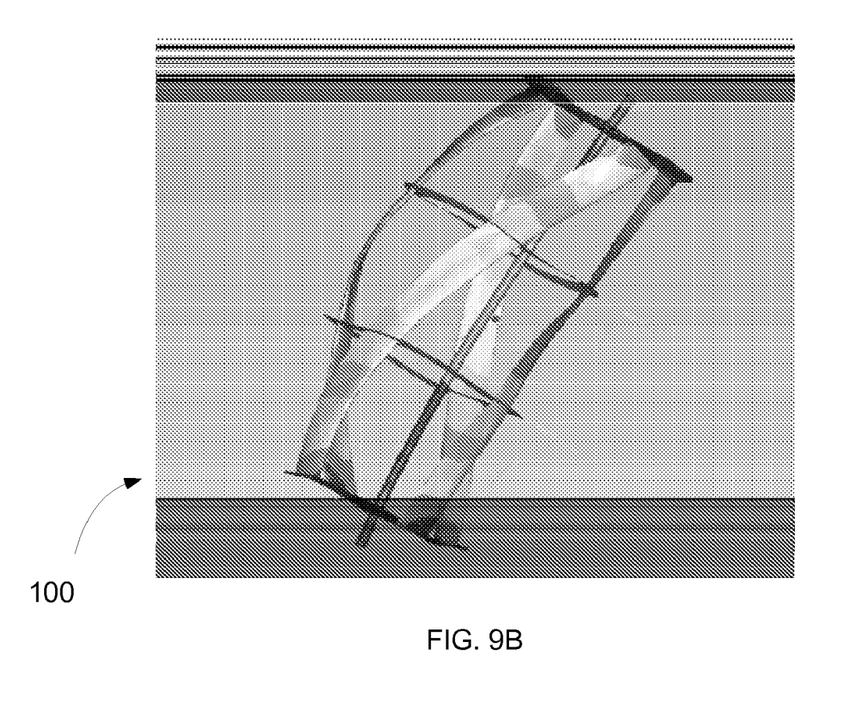
FIG. 9B depicts an analytical model of one embodiment of the turbine of the present invention.

Additionally, selecting an appropriate number of faired rings 107 for a particular turbine assists with reducing deformation under load. For example, FIGS. 9A and 9B depict finite element analysis of models of two turbines 100. The two turbines 100 are identical in all dimensions with the exception that the turbine 100 of FIG. 9A comprises one centrally located faired ring 107, and the turbine 100 of FIG. 9B comprises two equidistantly spaced faired rings 107. The turbine 100 of FIG. 9B exhibits less deflection because the location and number of faired rings 107 effectively constrains the plurality of blades 105 and enables more effective load transfer between the plurality of blades 105 so that the active blade 105 experiences reduced internal stress. In embodiments comprising more than one faired ring 107, even spacing of the faired rings 107 along the central axis 110 may be undesirable. Some optimization may be necessary for determining a placement location for the faired rings 107 along the length of the central axis 110. Optimally spacing the faired rings 107 decreases stress and strain on the plurality of blades and thereby reduces deflection and maximizes efficiency of power generation.

Figure 8A:
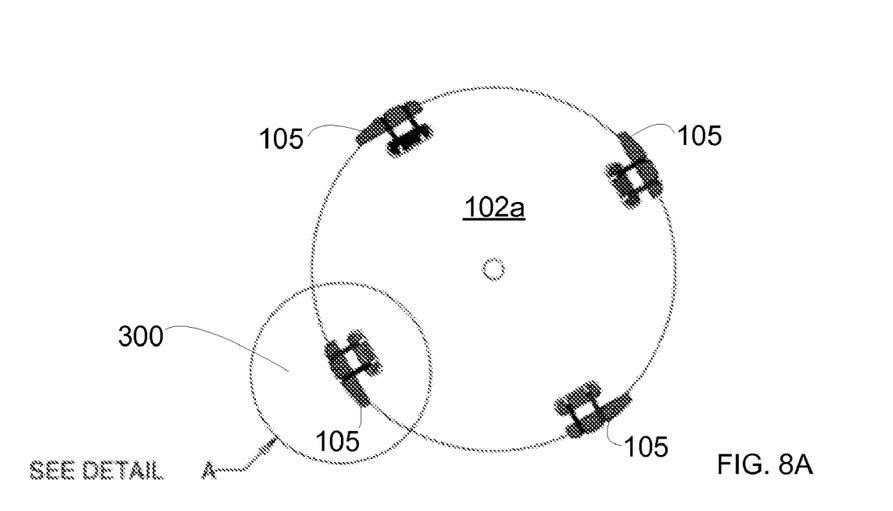
FIG. 8A depicts an end view of an embodiment of the turbine of the present invention.
Figure 8B:
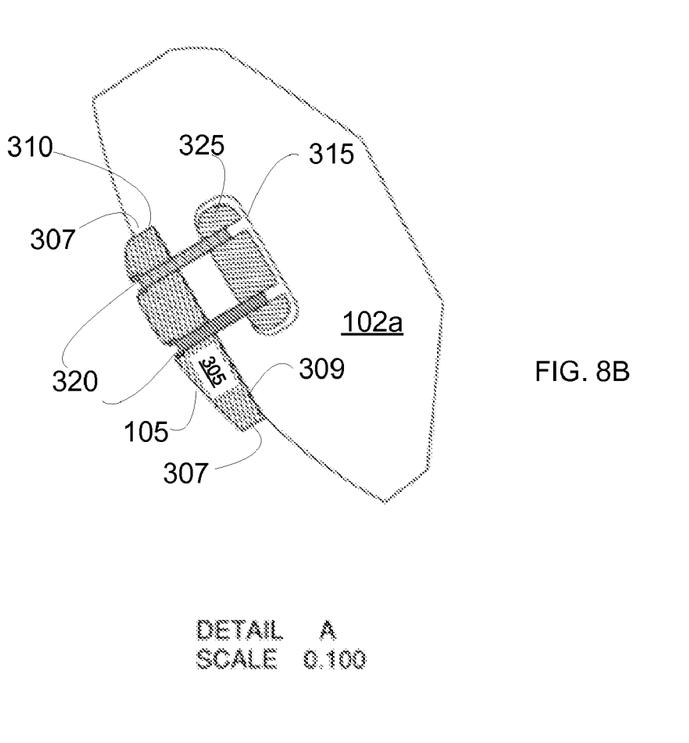
FIG. 8B depicts an enlarged sectional view of the embodiment of FIG. 8A.

The at least one faired ring 107 of the turbine 100 of the present invention intersects the plurality of blades 105 so that those elements are securely engaged for proper load transfer. FIGS. 8A and 8B depict one embodiment of a technique for joining the plurality of blades 105 to the at least one faired ring 107. In this embodiment, the plurality of blades 105 are molded from a fiber reinforced composite material, such as fiberglass. At each intersection 300 between the plurality of blades 105 and the at least one faired ring 107, the blade 105 has a solid, asymmetrically shaped cross-section 305 molded from fiberglass. The asymmetrically shaped cross-section 305 of a blade 105 at an intersection 300 thus has a shape that differs from all other, non-intersecting hydrofoil shaped cross sections 200 of the plurality of blades 105. The asymmetrically shaped cross-section 305 disposed at an intersection 300 with a faired ring 107 comprises two parallel linear edges 307 spaced apart by a longitudinal linear edge 309 extending between the two parallel liner edges. This configuration provides the asymmetrically shaped cross-section 305 with a partially rectangular outline that engages with a similarly shaped indentation 310 disposed at the outer circumferential edge of the intersecting faired ring 107.

In one embodiment, the faired ring 107 may be manufactured from a solid material having a rectangular-shaped indentation 310 machined therein. In another embodiment, the faired ring may be molded from a fiber reinforced composite so that the indentation 310 for receiving the asymmetrically shaped cross-section 305 is formed into the outside circumference of the faired ring 107. In any embodiment, the at least one faired ring 107 provides an indentation 310 for receiving therein a complimentary asymmetrically shaped cross-section 305. In the embodiment of FIGS. 8A and 8B, the longitudinal axis of the indentation 310 forms a non-perpendicular angle with the diameter of the faired ring 107. This embodiment accommodates the twist of the intersecting blade 105.

The embodiment of FIGS. 8A and 8B further comprises a bolting system for affixing an asymmetrically shaped cross-section 305 of a blade 105 to a faired ring 107. This bolting system comprises an oval shaped cut out 315 formed or machined into the faired ring 107 and having a longitudinal axis running parallel to the longitudinal axis of the indentation 310. The cut out 315 and indentation 310 are spaced apart by some span across the faired ring 107 sufficient for supporting one or more mechanical fasteners 320 inserted therethrough for engaging with a washer 325 disposed within the cut out 315. The one or more mechanical fasters, which may be for example, such as but not limited to, bolts, screw, and rivets, pass through the asymmetrically shaped cross-section 305 of the blade 105 and engage with the washer 325 for clamping the blade 105 securely to the faired ring 107.

The plurality of blades 105 and at least one faired ring 107 may be manufactured from any durable, lightweight material such as a lightweight metal, fiber reinforced composite or plastic, and the plurality of blades 105 and at least one faired ring 107 may be either hollow or solid. In one embodiment of the present invention, the plurality of blades 105 and at least one faired ring 107 are rotomolded of a fiber reinforced composite, such as fiberglass or a carbon fiber reinforced composite. Because of the at least one faired ring 107 transfers load effectively between the plurality of blades 105, thereby reducing stresses and decreasing deflection, the plurality of blades advantageously may be manufactured from a cost-effective, lightweight fiber reinforced composite 105 rather than a carbon fiber reinforced composite. In another embodiment of the present invention, the plurality of blades 105 and at least one faired ring 107 are non-hollow members manufactured from a high strength plastic material chosen from a group consisting of but not limited to polyhydroxybutyrate plastic, polystyrene, polymethyl methacrylate, nylon, acrylic, low density polyethylene, high density polyethylene, polypropylene, polyvinyl chloride, polyphenyl sulpfide, silicone, and polyurethane. The plurality of blades 105 and at least one faired ring 107 may be formed through any number of known manufacturing methods, such as machining, rotomolding, extrusion or injection molding.

Figures 1A, 1B, 1C:
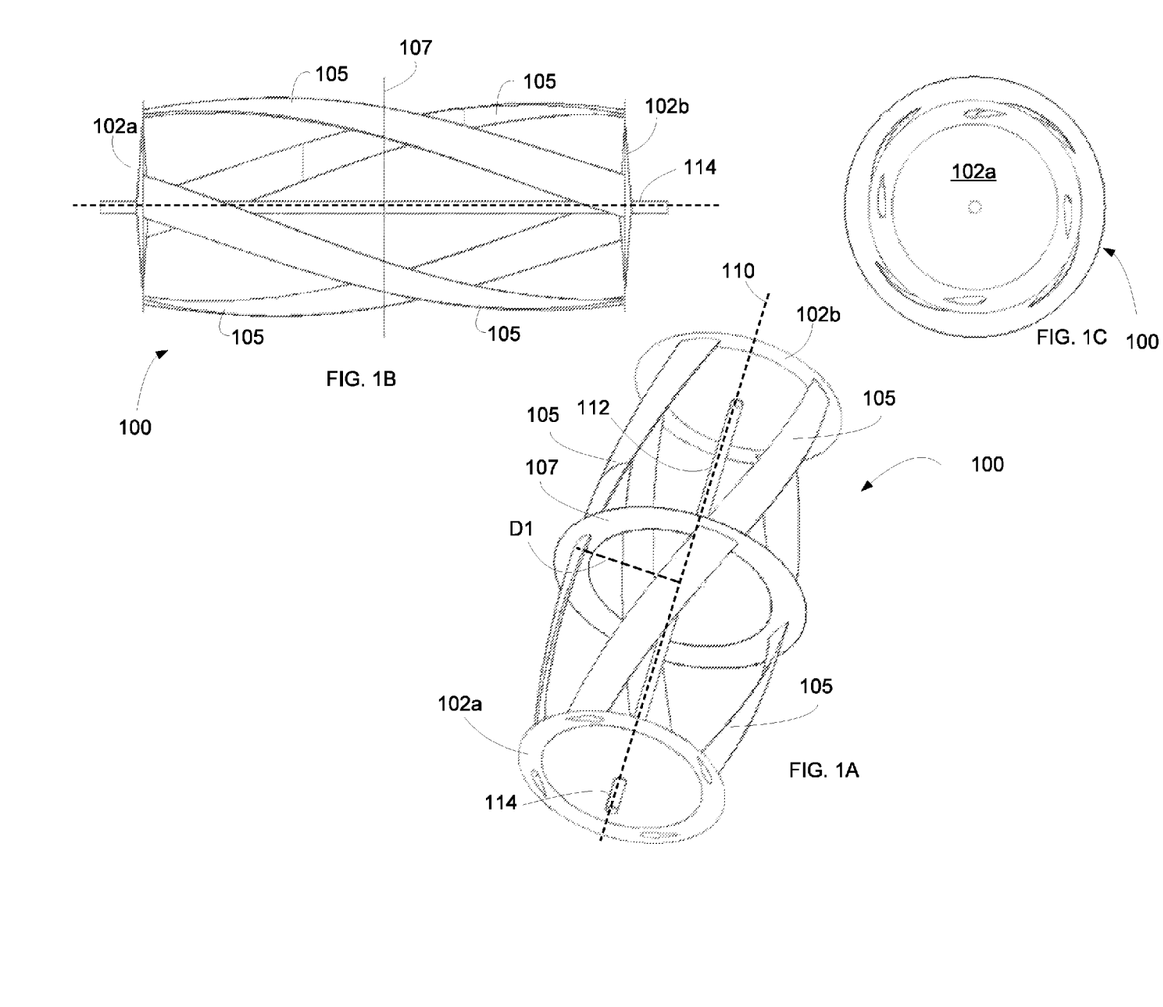
FIG. 1A depicts a perspective view of one embodiment of the turbine of the present invention.
FIG. 1B depicts a side view of the embodiment of the turbine of the FIG. 1A.
FIG. 1C depicts an end view of the embodiment of the turbine of the FIG. 1A.
Figures 2A, 2B, 2C:
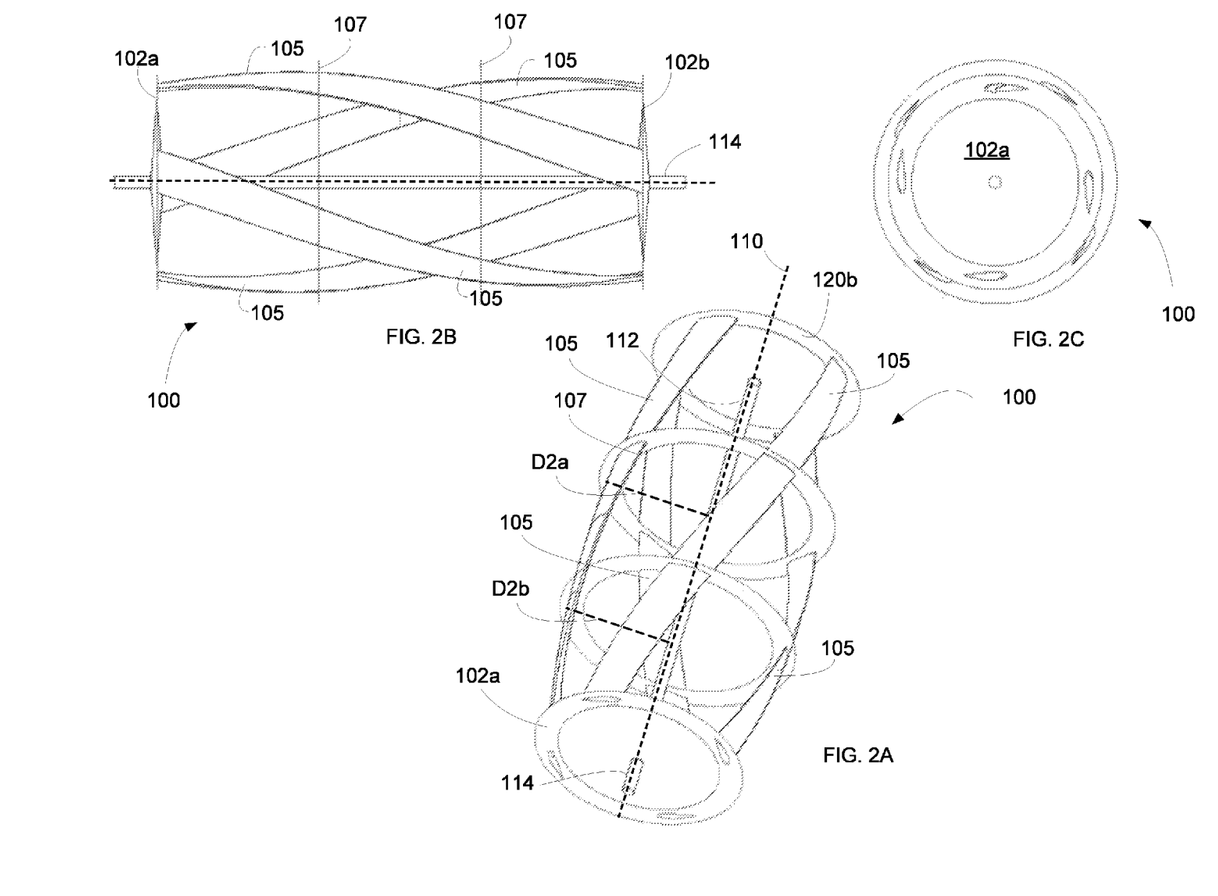
FIG. 2A depicts a perspective view of one embodiment of the turbine of the present invention.
FIG. 2B depicts a side view of the embodiment of the turbine of the FIG. 2A.
FIG. 2C depicts an end view of the embodiment of the turbine of the FIG. 2A.
Figures 3A, 3B, 3C:
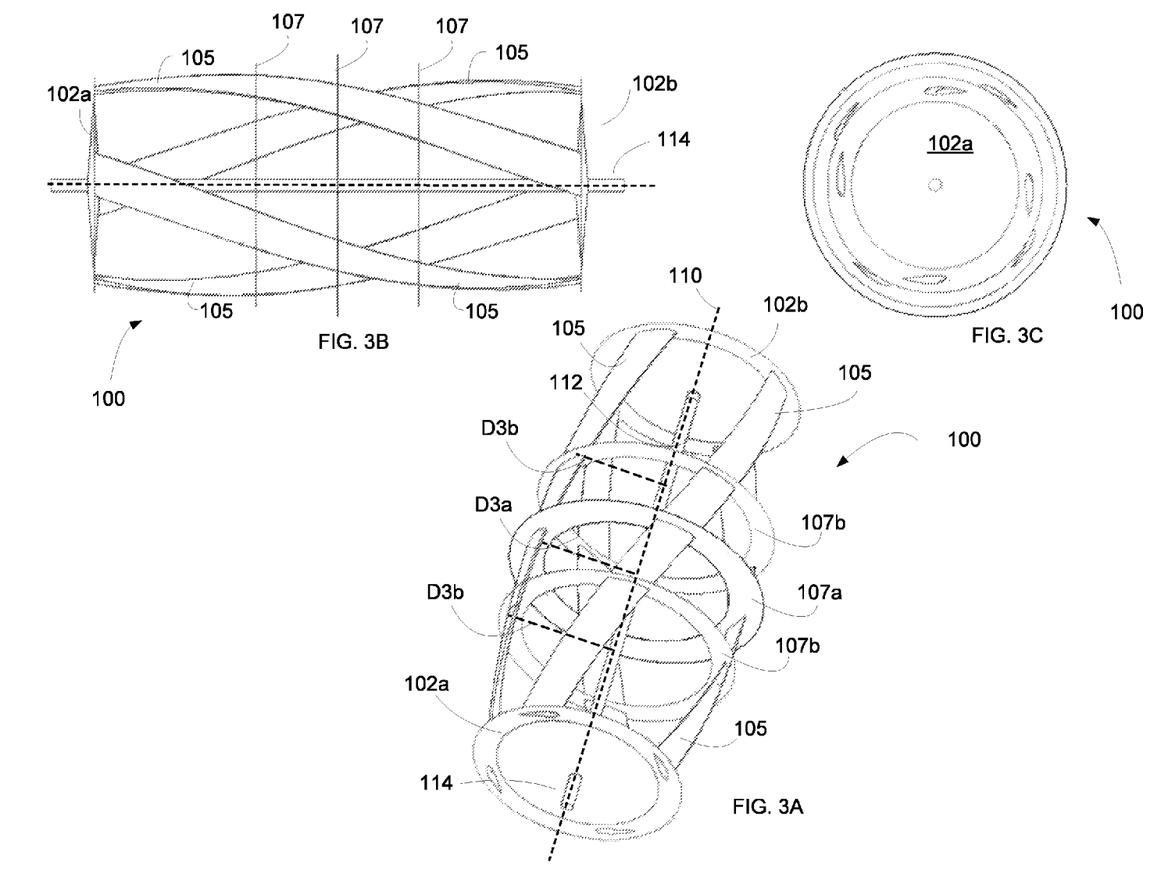
FIG. 3A depicts a perspective view of one embodiment of the turbine of the present invention.
FIG. 3B depicts a side view of the embodiment of the turbine of the FIG. 3A.
FIG. 3C depicts an end view of the embodiment of the turbine of the FIG. 3A.
Figures 4A, 4B, 4C:
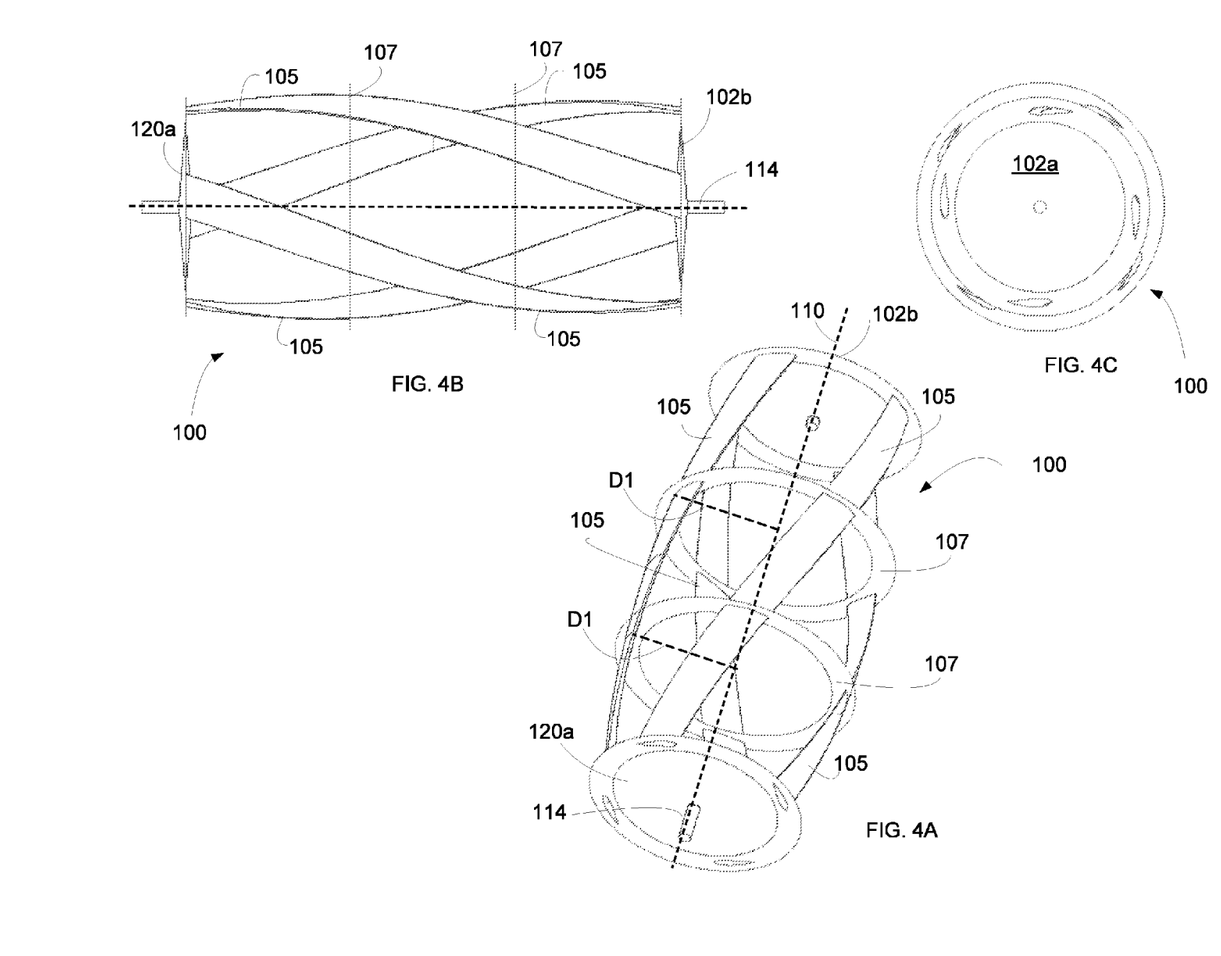
FIG. 4A depicts a perspective view of one embodiment of the turbine of the present invention.
FIG. 4B depicts a side view of the embodiment of the turbine of the FIG. 4A.
FIG. 4C depicts an end view of the embodiment of the turbine of the FIG. 4A.

In addition to a plurality of blades and at least one faired ring, some embodiments of the turbine, such as those of FIGS. 1B though 3C, may comprise a central shaft 112 disposed along the central axis 110 of the turbine. Other embodiments, such as that depicted in FIGS. 4A to 4C, require no central shaft 112 and instead comprise an end shaft 114 disposed on and/or integrated with an outside surface of at least one of the end discs 102a, 102b. As indicated in FIGS. 1A through 3C, embodiments of the turbine 100 comprising a central shaft 112 nonetheless also comprise an end shaft 114 disposed on at least one end disc 102a, 102b. In embodiments comprising a central shaft 112, the at least one end shaft 114 may be the portion of the central shaft 112 extending through and beyond an end disc 102a, 102b. Eliminating the central shaft 112 and maintaining only one or more end shafts 114 assists with reducing drag during rotational movement of the turbine 100 and decreasing the potential for debris entangling the turbine 100 and thereby reducing efficiency.

The end shaft 114 is adapted for engaging with one or more generators to generate power during rotation of the turbine 100. The end shafts 114 therefore are engaged securely with the end discs 102a, 102b so as to withstand any torque or moment forces that might otherwise shear an end shaft 114 from an end disc 102a, 102b. For example, an end shaft 114 may bolt to an end disc 102a, 102b or be formed with an end disc 102a, 102b from a single piece of stock. In the embodiments of FIGS. 1A through 4C, the end discs 102a, 102b are thicker toward their centers to increase rigidity and decrease stress at the connection point with the end shafts 114. FIGS. 1B, 2B, 3B and 4B most clearly depict this thickening technique. These figures depict symmetrical thickening on both sides of each end disc 102a, 102b. The localized thickening of the end discs 102a, 102b, however, may occur on one or both sides depending on factors such as presence of a central shaft 112, overall size of the turbine 100 and expected forces during use. Increasing cross-sectional thickness of the end discs 102a, 102b at the point of connection with the end shafts 114 enables a more effective and efficient transfer of load to the end shafts 114 and subsequently to an engaged generator (not shown).

When engaged with a generator, the turbine 100 of the present invention forms a turbine generator unit (TGU). The central shaft 112 and/or end shaft 114 is manufactured from any sturdy material capable of withstanding operational forces. For example, the central shaft 112 and/or end shaft 114 may be a two inch (2") diameter, schedule 80 steel pipe that has a variable length for accommodating one or more turbines 100 and/or accommodating variation in the trajectory of the plurality of blades 105 in a single turbine 100. One or more turbines 100 typically engage directly with a permanent magnet generator such that the generator requires no gearing multiplication. The one or more turbines 100 rotate within a fluid flow 250 and convert energy therein to mechanical energy that transfers directly through the rotating end shaft 114 to the submersible permanent magnet generator connected to the end shaft.

The generator converts the mechanical energy (i.e., RPM and torque) into electricity. In one embodiment, a power electronics system controls, conditions and synchronizes the generated electricity. The synchronized electricity then arrives at on-shore substations via one or more underwater transmission cables. As an alternative to sending the electric energy to shore, in yet another embodiment, the electrical generation systems could power production of hydrogen and/ or potable water at an off-shore site that could ship the hydrogen and/or potable water to any receiving terminal around the world.

The submersible TGU is positionable at optimal locations within current flow to most fully and efficiently utilize fluid flow energy and avoid interfering with commercial shipping and any other water surface activity. The horizontal configuration of the TGU generates power efficiently because the velocity of currents generally varies by depth; Very little variation usually occurs in the horizontal plane. The submersible turbine generator units nonetheless are adaptable for deployment in a vertical configuration. Such deployment is preferable in waterways having generally vertically uniform flow velocities which also may be largely unidirectional.

Submersible turbine-generator units according to embodiments of the present invention mount individually on a mounting platform, such as a barge, or several of them may mount ("stack") on a fully submersible platform structure (not shown). The platforms may anchor to the bottom of a waterway using a mooring system comprising mooring lines and anchors. Alternatively, TGUs deployed in shallow waters may mount directly to pilings or other appropriate existing foundation structures, such as, for example, existing oil drilling platforms or piers.

Figure 10:
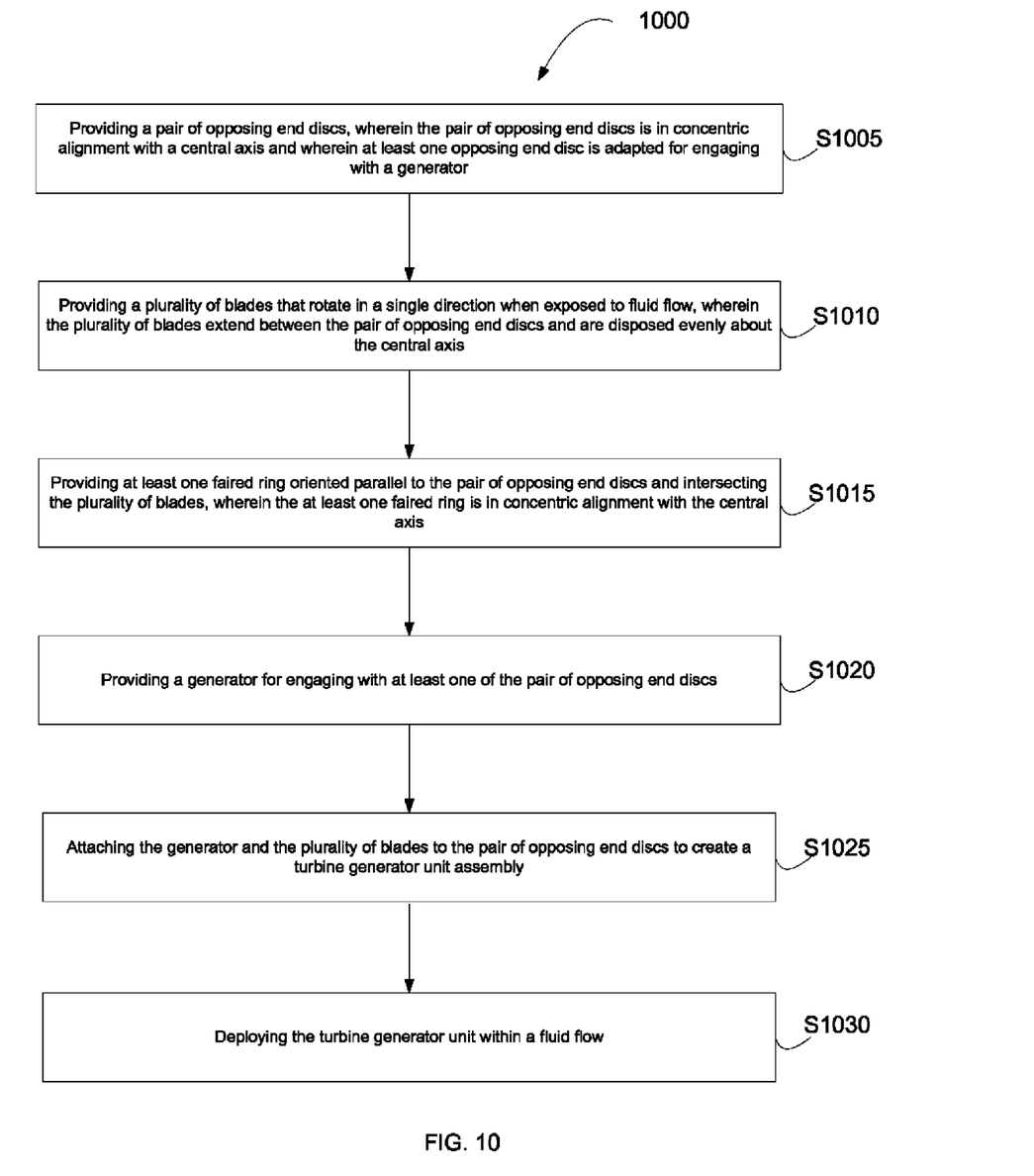
FIG. 10 is a schematic of one embodiment of a method of generating power according to the present invention

The present invention therefore includes a method of generating power 1000 by engaging the turbine 100 of the present invention with a generator to form a turbine generator unit for deployment within a fluid flow 250. FIG. 10 depicts one embodiment of the method for generating power 1000. A first step S1005 comprises providing a pair of opposing end discs 102a, 102b, wherein the pair of opposing end discs 102a, 102b is in concentric alignment with a central axis 110 and wherein at least one opposing end disc 102a, 102b is adapted for engaging with a generator. A second step S1010 comprises providing a plurality of blades 105 that rotate in a single direction when exposed to fluid flow 250, wherein the plurality of blades 105 extend between the pair of opposing end discs 102a, 102b and are disposed evenly about the central axis 110.

The plurality of blades 105 rotate in a single direction when exposed to fluid flow and cause the pair of opposing end discs 102a, 102b to rotate. The plurality of blades 105 traces a spiral wound path about a central axis 110 of the turbine 100. The spiral wound trajectory of the plurality of blades has a variable radius along the length of the turbine 100 such that a distance measured from the plurality of blades 105 to the central axis 110 is greater at the center of the turbine 100 than at either end. For example, as depicted clearly in the embodiments of FIGS. 1A, 2A, 3A, 4A and 7A, the plurality of blades 105 assume a shape equivalent to a curve traced on a barrel by rotation of a point crossing the circular right cross-sections of the barrel at a changing oblique angle. The plurality of blades 105 thus presents a spiral wound trajectory having a variable radius along the length of the central axis 110.

A third step S1015 in the embodiment of the method of generating power depicted in FIG. 10 comprises providing at least one faired ring 107 oriented parallel to the pair of opposing end discs 102a, 102b and intersecting the plurality of blades 105, wherein the at least one faired ring 107 is in concentric alignment with the central axis 110. A fourth step S1020 comprises providing a generator for engaging with at least one of the pair of opposing end discs 102a, 102b, and a fifth step S1025 comprises attaching the generator and the plurality of blades 105 to the pair of opposing end discs 102a, 102b to create a turbine generator unit assembly. Lastly, a final step 1030 comprises deploying the turbine generator unit within a fluid flow 250.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:

1. A turbine comprising:
   a) a pair of opposing end discs bounding the turbine at both ends, wherein the pair of opposing end discs is in concentric alignment with a central axis and wherein at least one opposing end disc is adapted for engaging with a generator;
   b) a plurality of blades that rotate in a single direction when exposed to fluid flow wherein: i) the plurality of blades extend between the pair of opposing end discs and are disposed evenly about the central axis, ii) wherein the rotating plurality of blades causes the pair of opposing end discs to rotate, iii) wherein the plurality of blades define a spiral wound trajectory around the central axis, the spiral wound trajectory having a variable radius along the length of the turbine such that a distance measured from the plurality of blades to the central axis is greater at the center of the turbine than at either end, and iv) wherein the plurality of blades further comprise an airfoil-shaped cross section having a non-zero angle of attack, which angle is defined by an intersection of the chord of the airfoil-shaped cross section and a tangential line abutting the same cross section and oriented in the direction of relative fluid flow; and
   c) at least one faired ring oriented parallel to the pair of opposing end discs and intersecting the plurality of blades, wherein the at least one faired ring is in concentric alignment with the central axis.

2. The turbine of claim 1 wherein the plurality of blades is at least two blades spiraling around the central axis.

3. The turbine of claim 1 wherein the angle of attack varies along the length of the turbine.

4. The turbine of claim 1 wherein a projection of the trajectory of the plurality of blades is barrel shaped such that a radial distance between the plurality of blades and the central axis is smaller at the ends of the turbine than at any point between the ends.

5. The turbine of claim 1 wherein the cumulative sweep of the plurality of blades traverses one or more 360 degree turns about the central axis.

6. The turbine of claim 1 wherein the turbine operates while submerged in a fluid gas and/or fluid liquid.

7. The turbine of claim 1 wherein the plurality of blades is manufactured from a durable lightweight material.

8. The turbine of claim 1, further comprising a central shaft extending along the central axis, wherein the central shaft engages with the pair of opposing end discs.

9. The turbine of claim 1, further comprising a shaft disposed between one of the pair of opposing end discs and the generator.

10. A method for generating power comprising:
a) providing a pair of opposing end discs, wherein the pair of opposing end discs is in concentric alignment with a central axis and wherein at least one opposing end disc is adapted for engaging with a generator;
b) providing a plurality of blades that rotate in a single direction when exposed to fluid flow wherein: i) the plurality of blades extend between the pair of opposing end discs and are disposed evenly about the central axis, ii) wherein the rotating plurality of blades causes the pair of opposing end discs to rotate, iii) wherein the plurality of blades define a spiral wound trajectory around the central axis, the spiral wound trajectory having a variable radius along the length of the turbine such that a distance measured from the plurality of blades to the central axis is greater at the center of the turbine than at either end, and iv) wherein the plurality of blades further comprise an airfoil-shaped cross section having a non-zero angle of attack, which angle is defined by an intersection of the chord of the airfoil-shaped cross section and a tangential line abutting the same cross section and oriented in the direction of relative fluid flow;
c) providing at least one faired ring oriented parallel to the pair of opposing end discs and intersecting the plurality of blades, wherein the at least one faired ring is in concentric alignment with the central axis;
d) providing a generator for engaging with at least one of the pair of opposing end discs;
e) attaching the generator and the plurality of blades to the pair of opposing end discs to create a turbine generator unit assembly; and
f) deploying the turbine generator unit within a fluid flow.

11. The method of claim 10, further comprising harnessing power from the generator via transmission lines extending between the turbine generator unit and a base power station.

12. The method of claim 10 wherein the plurality of blades is at least two blades spiraling around the central shaft.

13. The method of claim 10 wherein the angle of attack varies along the length of the turbine.

14. The method of claim 10 wherein a projection of the trajectory of the plurality of blades is barrel shaped such that a radial distance between the plurality of blades and the central axis is smaller at the ends of the turbine than at any point between the ends.

15. The method of claim 10 wherein the cumulative sweep of the plurality of blades traverses one or more 360 degree turns about the central axis.

16. The method of claim 10 wherein the spiral wound, variable radius trajectory of the plurality of blades reduces stress and strain under load conditions.

17. The method of claim 10 wherein the turbine operates while submerged in a fluid gas and/or fluid liquid.

18. The method of claim 10 wherein the plurality of blades is manufactured from a durable lightweight material.

19. The method of claim 10, further comprising a central shaft extending along the central axis, wherein the central shaft engages with the pair of opposing end discs.

20. The method of claim 10, further comprising a shaft disposed between one of the pair of opposing end discs and the generator.

* * * * *